INVENTOR.
WILFORD N. HANSEN
JAMES A. HORTON

ATTORNEY

INVENTOR.
WILFORD N. HANSEN
JAMES A. HORTON

BY *[signature]*

ATTORNEY

United States Patent Office
3,439,968
Patented Apr. 22, 1969

3,439,968
INFRARED RADIATION BREWSTER'S ANGLE POLARIZER
Wilford N. Hansen and James A. Horton, Thousand Oaks, Calif., assignors to North American Rockwell Corporation, a corporation of Delaware
Filed June 25, 1965, Ser. No. 466,883
Int. Cl. G02b 13/14
U.S. Cl. 350—1                                         10 Claims

ABSTRACT OF THE DISCLOSURE

The normal "piles-of-plates" polarizing structure has been modified to provide a compact polarizer from which either of two orthogonal modes of polarization, or a combination thereof, can be obtained for infrared radiation. The improved polarizer utilizes a "crossed plate" type of structure with at least two germanium plates wherein incident radiation strikes the surfaces of said plates at the Brewster's angle and one mode is transmitted therethrough while the other mode is reflected into a parallel path. Movable masks are provided to control the amount of each mode present in the output radiation.

---

The present invention is directed to polarizers and more particularly to polarizers for infrared radiation.

Devices of the prior art for polarizing infrared radiation are usually of the "pile-of-plates" type and have the disadvantage of relatively long lengths making them unsatisfactory for many applications. In order to substantially reduce the length of such polarizers the normal "pile-of-plates" arrangement has been modified to provide a crossed plate structure thereby increasing the number of applications. However, such polarizers are limited in use to a single mode of polarization unless mounted for rotation about the optical axis, thereby necessitating a substantial increase in the size of the polarizing plates used as well as precision angular adjustments. The present invention is directed to an improved polarizer for infrared radiation in which both modes of polarization may be obtained with a simple linear movement and with a minimum of components and precision parts.

Therefore, it is an object of the present invention to provide a polarizing device for infrared radiation which can provide a polarized beam consisting essentially of all parallel or all perpendicular polarized radiation or preselected combinations of polarized modes.

Another object of the present invention is to provide a compact infrared radiation polarizer which is highly efficient and which may be changed from one mode of polarization to the other mode of polarization by a simple linear movement.

A further object of the present invention is to provide a compact infrared radiation polarizer in which either mode of polarization or preselected mixing of different modes of polarization may be accomplished.

These and other objects of the present invention will be more apparent from the following detailed description and drawings, made a part thereof, in which.

Figure 1:
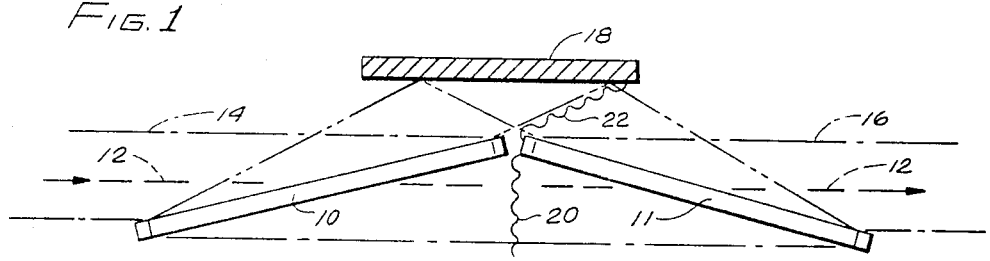
FIG. 1 shows a schematic view of one embodiment of the present invention.

Referring now to the drawings in detail, the polarizer of FIG. 1 includes a pair of germanium plates 10 and 11, preferably of constant thickness, oppositely disposed with respect to each other and with respect to an optical axis 12 passing through the plates. The incident surfaces of plates 10 and 11 are positioned so that radiation passing along an optical axis 12 strikes the incident surfaces at about Brewster's angle. In this manner an incident beam of infrared radiation, indicated generally at 14, passing in either direction along axis 12 will be refracted through the plates 10 and 11 so that the exit beam 16 will be polarized in the parallel mode. For the purposes of this description the parallel polarization mode is defined as that polarization in which the electric vector is parallel to the plane of incidence of the polarizer and the perpendicular polarization mode is normal to that plane. A flat highly reflecting mirror 18 is supported in any well known manner adjacent the plates 10 and 11 and positioned so that its reflecting surface provides a means for directing radiation reflection from the incident surfaces of plate 10 in a path toward the surfaces of plate 11 such that the radiation will be reflected from the surfaces of two different plates. Thus, the incident beam will be reflected by the surfaces of plate 10 toward the mirror 18, redirected by reflection from the mirror 18 toward the surfaces of plate 11, and reflected from the surfaces of plate 11 along the optical axis 12. The reflection of the beam 14 by the surfaces of plates 10 and 11 results in that portion being polarized in the perpendicular mode. For ease in description the incident beam 14 as well as the path of the parallel mode is depicted in the drawings as a single dot center line, while the path of the perpendicular mode is depicted as a double dot center line. The width and length of the plates 10 and 11 and mirror 18 are selected to accommodate the dimensions of the incident beam 14. The plates 10 and 11 are as thin as possible consistent with usual handling procedures.

It is apparent from FIG. 1 that the exit beam 16 will be a mixture of polarization modes dependent entirely on the polarization efficiency of the reflecting and refracting characteristics of the plates 10 and 11, since the depolarization by mirror surface 18 is negligible. In order to control the fraction of each mode present in the exit beam 16 a movable mask, screen or neutral density filter, indicated at 20 and 22, is provided in each path. Thus, if essentially pure polarized radiation of the parallel mode is desired a mask 22 is inserted to prevent the passage of radiation along the perpendicular polarization path and mask 20 is removed to allow passage of the parallel mode. Similarly, mask 20 may be completely inserted and mask 22 removed in order to obtain radiation at 16 which consists essentially of perpendicular mode polarized infrared radiation. It is equally apparent that any desired mixture of the parallel and perpendicular polarization modes may be obtained by properly positioning each of the movable masks 20 and 22 so that they partially intersect the appropriate beam, or by inserting filter members which pass a portion of one polarized beam. The mirror 18 and plates 10 and 11 are preferably held in rigid structural relationship by suitable base and frame members (not shown) on which the members 20 and 22 may be slidably supported. Alternatively, the mirror 18 may be removably from the reflecting position shown to provide another means for controlling the amount of perpendicular polarized radiation in the beam 16.

The embodiment of FIG. 1 provides a polarized radiation beam in which either polarization may be obtained. However, additional germanium plates may be necessary to obtain ultra pure parallel mode radiation.

Figure 2:
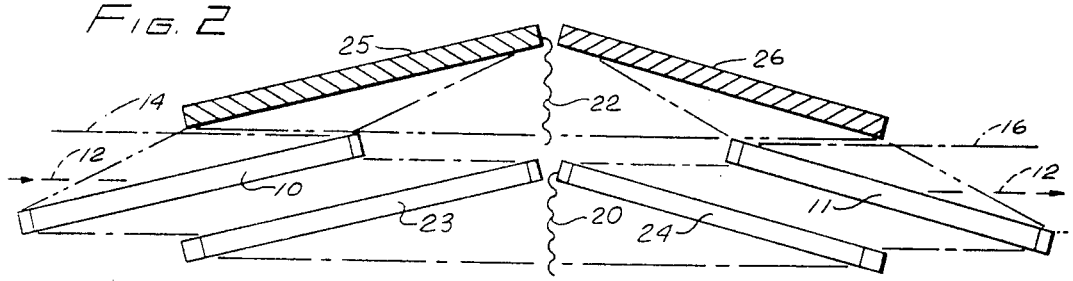
FIG. 2 shows a schematic view of a second embodiment of the present invention.

The embodiment of FIG. 2 shows an arrangement which includes additional germanium plates in order to obtain ultra pure parallel polarized radiation, and has the advantage over the embodiment of FIG. 1 that the consequences of minor misalignments are substantially reduced for the perpendicular mode. This embodiment utilizes a conventional pile-of-plates type parallel polarization arrangement consisting of end plates 10 and 11 and intermediate plates 23 and 24. The germanium plates 23 and 24 are preferably supported in parallel relation to the respective plates 10 and 11, although wedge shaped plates angularly oriented with respect to each other may be used, as is well known in the art.

A pair of mirrors 25 and 26 are utilized for directing reflected radiation along the perpendicular mode path rather than a single mirror as in the embodiment of FIG. 1. In this manner the width of the device is substantially reduced. The mirrors 25 and 26 are preferably positioned parallel to the incident surfaces of plates 10 and 11, respectively. However, this relation may be varied so long as the angle between the mirror surfaces and the angle between the incident surfaces of plates 10 and 11 are the same. Filter or screen elements 20 and 22 are provided in the respective mode paths for selectively changing or controlling the mixture of modes at the exit beam 16 or for eliminating the radiation of one mode. The operation is the same as that of the embodiment of FIG. 1 except that greater parallel mode polarization efficiency is obtainable. While two filter or screen elements 20 and 22 are shown, it is apparent that one may be utilized, supported by a suitable frame (not shown), which may be moved from one position, as at 20, to the other position, as at 22, or an intermediate position when mixtures of two modes are desirable. In this manner the partial shuttering of one polarization mode provides a convenient means for obtaining equal base lines on each polarization when the device is used in a spectrophotometer.

In both embodiments of FIGS. 1 and 2 the optical elements, germanium plates and mirrors preferably remain fixed with respect to optical axis. In this manner the selection of the polarization mode may be made without any change in optical alignment. However, it is within the purview of the invention to remove plate 10 or 11 and substitute a mirror element when only the perpendicular mode of polarization is desired. Such a substitute of elements has the advantages of reducing the beam intensity losses while having only a small effect on the efficiency of the polarization in that mode for well collimated beams. However, such an arrangement has the disadvantage of preventing the mixing of the two polarization modes in the exit beam 16. This same substitution can also be utilized in the embodiment of FIG. 1 with resulting loss in versatility of operation in the mixed mode. Where beam intensity loss is not a consideration and ultra high purity perpendicular mode polarization is desirable, germanium surfaces may be utilized for the mirrored surfaces of mirrors 25 and/or 26.

Figure 3:
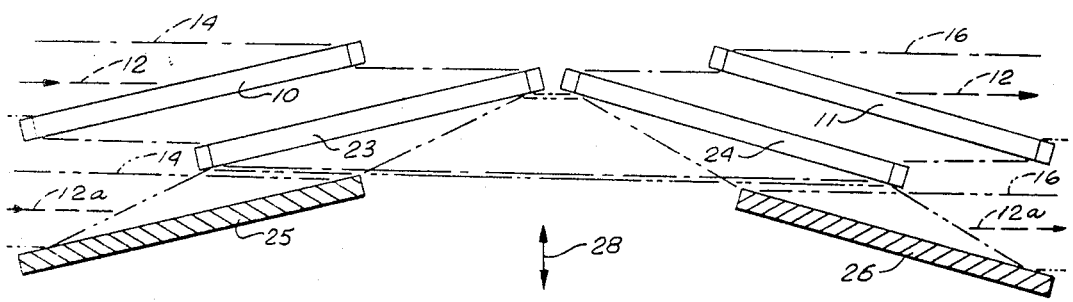
FIG. 3 shows a schematic view of a third embodiment of the present invention.

The embodiment of FIG. 3 utilizes the "pile-of-plates" type infrared radiation filter similar to that used in FIG. 2 for obtaining the parallel polarization mode. A pair of oppositely disposed mirrors are utilized which may be the same as 25 and 26 of FIG. 2 except they are positioned below plates 23 and 24. The mirrors 25 and 26 are oriented to reflect radiation passing along path 12a toward the surface of plate 23 where it is reflected to the surface of plate 24 and by the surface of mirror 26 along axis 12a. In this embodiment the entire device, i.e., germanium plates 10, 11, 23 and 24 and mirrors 25 and 26, while rigidly supported with respect to each other by an appropriate frame (not shown), are movable on a base element (not shown) in a direction normal to the optical axis 12 as indicated by arrow 28. Thus, two positions are available, the first in which the incoming beam 14 is directed to the surface of plate 10 thereby providing a parallel mode of polarization, the second in which the incoming beam 14 is directed to the mirrored surface of element 25 and then to the surface of plate 23 thereby providing a perpendicular polarization mode. While mixing of the two modes is possible with the device of FIG. 3, the radiation incident on the ends of plates 10 and 23 exposed to the incoming beam 14 would be scattered and the exit beam would have areas of unequal intensity thereby materially degrading device efficiency. Thus, this embodiment is not adapted for use in the mixed mode operation. However, it does provide an infrared polarizer in which either of the two modes of polarization may be selected by a simple movement of the device from a first position to a second position.

Figure 4:
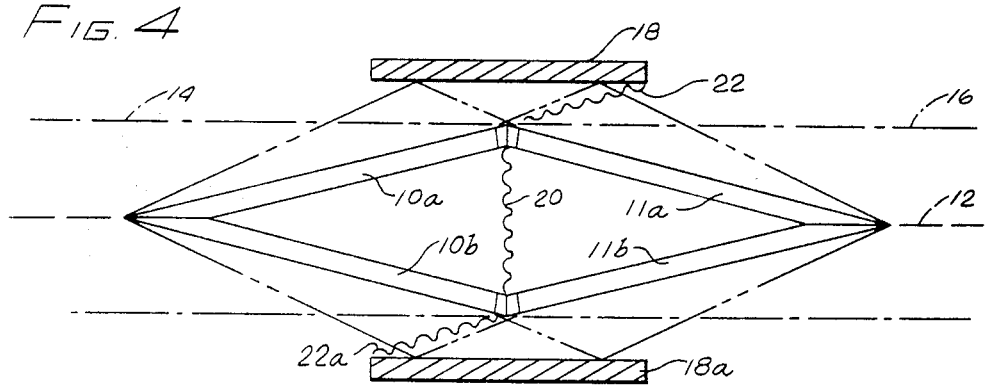
FIG. 4 shows a schematic view of a modification of the embodiment of FIG. 1.
Figure 4A:
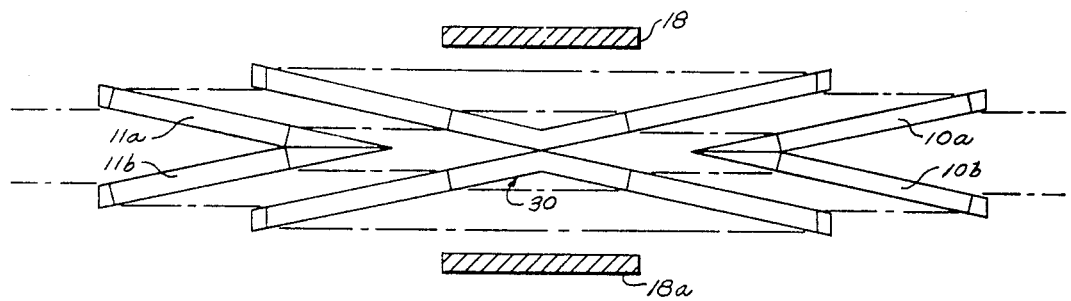
FIG. 4a shows a modified arrangement utilizing the elements of FIG. 4.
Figure 5:
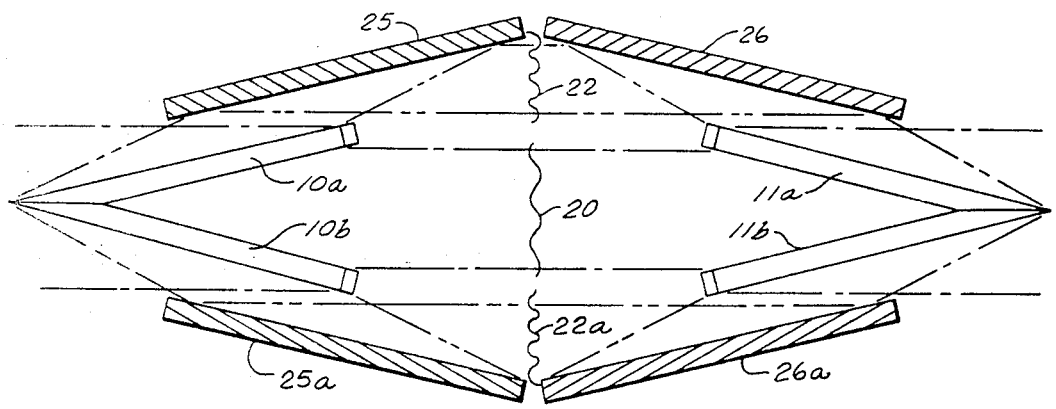
FIG. 5 shows a schematic view of a modification of the embodiment of FIG. 2.

Various modifications of the embodiments of FIGS. 1–3 are shown in FIGS. 4, 4a and 5. Specifically, FIG. 4 shows the use of a diamond shaped germanium plate configuration which operates in the manner described above with respect to FIG. 1 except that the germanium plates 10 and 11 have been fabricated in a two piece folded arrangement and an additional reflector 18a provided. This arrangement substantially reduces the length of the device thereby facilitating use in areas of limited space, although some beam splitting will result. Appropriate filter elements 20, 22 and 22a are provided to facilitate operation with selectively mixed modes of polarized radiation.

FIG. 4a shows the use of the elements of the devices of FIG. 4 in a single mode arrangement. Thus, by removing the germanium plates 10a, 10b, 11a and 11b and positioning them as shown in FIG. 4a together with a conventional crossed plate polarizer 30 an ultra pure parallel polarized beam may be obtained. In the arrangement of FIG. 4a the mirrors are not utilized.

FIG. 5 shows the use of an expanded diamond shaped germanium plate configuration which functions in the manner described with respect to FIG. 2. In this arrangement additional mirrors 25a and 26a are provided for the folded portions 10b and 11b of the germanium plates. Because of the expanded geometry additional germanium plates of the folded type (not shown) corresponding to plates 23 and 24 of FIG. 2 may be inserted inside the configuration to obtain a high purity parallel mode polarization. Appropriate filter and screen elements 20, 22 and 22a are provided to facilitate operation with mixed mode radiation. The folded plate arrangement substantially reduces the length of the device but has the disadvantage of introducing a split beam.

Although particular embodiments of the present invention have been described, various modifications will be apparent to those skilled in the art without departing from the scope of the invention. Therefore, the present invention is not limited to the specific embodiments disclosed but only by the appended claims.

We claim:

1. A polarizer for infrared radiation comprising at least two germanium plates oppositely disposed with respect to each other and to an optical axis passing through said plates, each of said plates having at least one surface positioned at Brewster's angle with respect to said optical axis, a first radiation path passing through said plates so that radiation passing along said path is polarized in a preselected mode; a second radiation path for polarizing radiation in a second mode, said second path having reflecting means supported adjacent said plates and so positioned, with respect to said optical axis and said plates, that radiation will be reflected from at least one plate surface to polarize said radiation in said second mode, and means for selectively changing the amount of radiation passing along each of said first and second paths, said radiation of said first and second path having an axis parallel to said optical axis.

2. The polarizer of claim 1 wherein said last means includes mask means movably positioned in each of said paths.

3. The polarizer of claim 1 wherein said plates and reflecting means are supported in fixed relation to each other and are movable in a direction normal to said optical axis.

4. A polarizer for infrared radiation comprising at least two germanium plates oppositely disposed with respect to each other and to an optical axis passing through said plates, each of said plates having at least one surface positioned at Brewster's angle with respect to said axis so that a first portion of infrared radiation passing along said axis will be directed along a first path to polarize said radiation in a preselected mode and a second portion will be directed along at least one second path, reflection means supported adjacent said plates and positioned in said second path to reflect said radiation toward a plate surface such that said second portion is polarized in another mode, and means for controlling the amount of radiation passing along said first and second path, said radiation of said first and second path having an axis parallel to said optical axis.

5. The polarizer of claim 4 wherein said mirror means includes at least one pair of reflecting surfaces angularly disposed with respect to each other, said angle between said reflecting surfaces being equal to the angle between said at least one surface of said plates.

6. The polarizer of claim 4 wherein said mirror means includes at least one mirror having its reflecting surface parallel to said optical axis.

7. The polarizer of claim 4 wherein said last named means includes means removably positioned in said paths for selectively masking the radiation passing along each of said paths.

8. A polarizer for infrared radiation comprising at least one pair of germanium plates oppositely disposed with respect to each other and to an optical axis passing through said plates, each of said plates having an incident radiation surface positioned at Brewster's angle with respect to said axis so that a first portion of radiation passing along said axis will be refracted through said plates along a first path to polarize said radiation in a preselected mode and a second portion of radiation will be reflected by a first incident surface to polarize said radiation in another mode and will be directed along a second path, a reflection surface supported adjacent said plates and positioned in said second path to direct radiation reflected by one of said incident surfaces toward another incident surface, means removably positioned in said first path for controlling the amount of radiation passing along said first path and means removably positioned in said second path for controlling the amount of radiation passing along said second path, said radiation of said first and second path having an axis parallel to said optical axis.

9. A polarizer for infrared radiation comprising at least one pair of germanium plates oppositely disposed with respect to each other and to an optical axis passing through said plates, each of said plates having an incident radiation surface positioned at Brewster's angle with respect to said axis so that a first portion of radiation passing along said axis will be refracted through said plates along a first path to polarize said radiation in a preselected mode and a second portion of said radiation will be reflected by a first incident surface to polarize said radiation in another mode and will be directed along a second path, a pair of mirrors having reflection surfaces angularly disposed with respect to each other, the angle between said mirror surfaces being equal to the angle between said incident surfaces of said plates, one of said mirrors being positioned in said second path to direct said second portion of radiation reflected from said first incident surface toward said second mirror, said second mirror directing radiation incident thereon toward another incident plate surface, and means removably positioned in said paths for selectively controlling the amount of radiation passing along said first and second paths, said radiation of said first and second path having an axis parallel to said optical axis.

10. A polarizer for infrared radiation comprising at least one pair of folded germanium plates forming a general diamond configuration, each of said plates having segments oppositely disposed with respect to each other and to an optical axis passing through said configuration, the outside surfaces of each of said folded plates being an incident radiation surface positioned at Brewster's angle with respect to said axis so that a first portion of radiation incident on said folded plates will be refracted along a first path to polarize said radiation in a preselected mode and a second portion of said radiation will be reflected to polarize said radiation in another mode and will be directed along a plurality of second paths, reflection means supported adjacent said plate configuration and positioned in each of said second paths to direct radiation reflected from a first incident plate surface to a second incident plate surface, and means for selectively controlling the amount of radiation passing along said paths, said radiation of said first and second path having an axis parallel to said optical axis.

References Cited

UNITED STATES PATENTS 3,302,028   1/1967   Sterzer _____ 350—150

FOREIGN PATENTS 1,155,625   5/1958   France.

OTHER REFERENCES

Klauser: "Infrared Polarizer," IBM Technical Disclosure Bulletin, vol. 6, No. 10, March 1964, p. 51.

Harrick: "Crossed-Plate Infrared Polarizer," JOSA, vol. 54, No. 10, October 1964, pp. 1281–1282.

Gerritsen: "Infrared Polarizer," RCA Technical Notes: No. 608, March 1965.

DAVID SCHONBERG, *Primary Examiner.*

PAUL R. MILLER, *Assistant Examiner.*

U.S. Cl. X.R.

350—147, 152